Nov. 20, 1934.　　　J. ENDERLIN　　　1,981,615
ROTARY MOTOR
Original Filed Dec. 4, 1931　4 Sheets-Sheet 1

INVENTOR.
Joseph Enderlin
BY
ATTORNEY

Nov. 20, 1934.  J. ENDERLIN  1,981,615
ROTARY MOTOR
Original Filed Dec. 4, 1931   4 Sheets-Sheet 2

INVENTOR.
Joseph Enderlin
BY
ATTORNEY.

INVENTOR.
Joseph Enderlin
ATTORNEY

Nov. 20, 1934.  J. ENDERLIN  1,981,615
ROTARY MOTOR
Original Filed Dec. 4, 1931    4 Sheets-Sheet 4
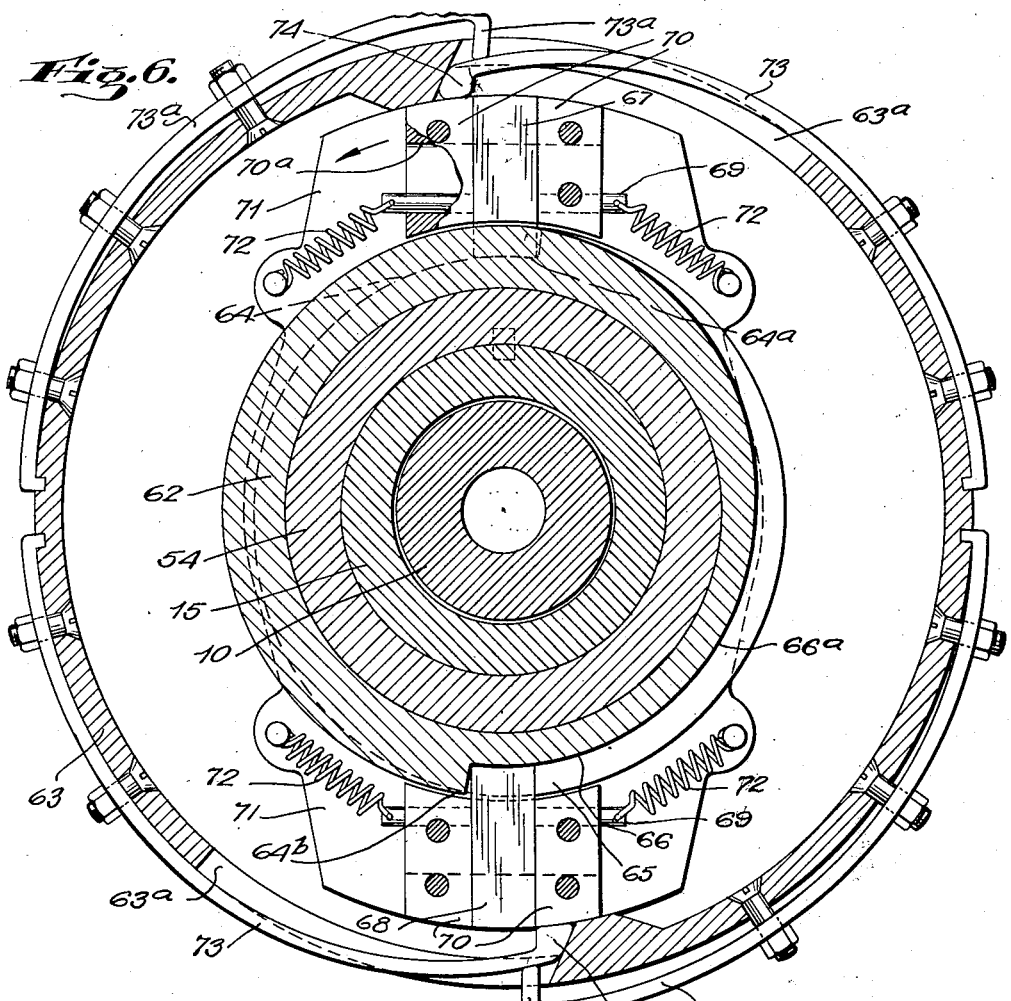
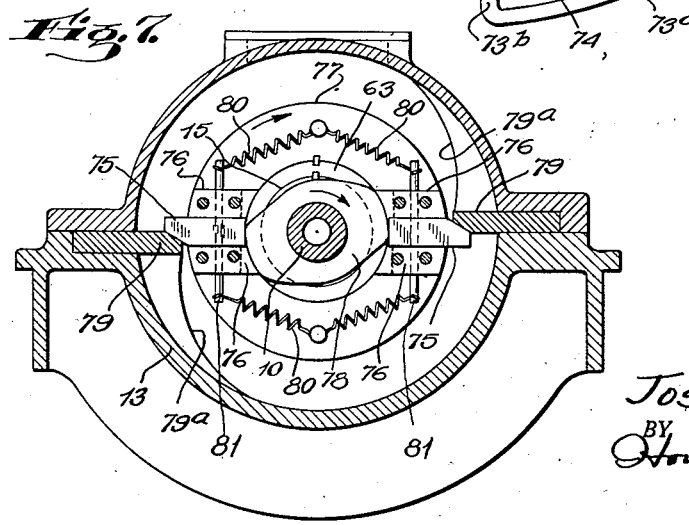
INVENTOR.
Joseph Enderlin
BY
ATTORNEY Patented Nov. 20, 1934

1,981,615

UNITED STATES PATENT OFFICE 1,981,615

ROTARY MOTOR

Joseph Enderlin, East Northport, N. Y.

Application December 4, 1931, Serial No. 578,947
Renewed March 29, 1934

17 Claims. (Cl. 123—11)

This invention relates to a rotary motor in the form of an internal combustion engine; and the object of the invention is to provide an engine of the class described comprising a power shaft to which is fixed a cylinder carrying piston heads by means of which said cylinder and shaft are rotated in the operation of the engine, and further in the provision of heads held in stationary position during the firing and intake strokes of the pistons and movable with and at a speed greater than that of the pistons and cylinder to perform throughout the complete cycle of operation the intake, compression, firing and exhaust strokes common in engines of this class; a further object being to provide an engine of the class specified wherein said cylinder heads are disposed within the rotatable cylinder in opposed relation to each other and arranged on a supplemental shaft rotatably supported on the first named shaft; a further object being to provide means for intermittently stopping the cylinder heads after each 180° of revolution thereof, and for holding said heads against movement during a one-quarter revolution of said pistons and cylinder, the cylinder having intake and exhaust ports adapted to register with rotatable valves for controlling the passage of gases into the cylinder through said ports and the exhaust of burnt gases therefrom; a further object being to provide means for rotating the valves to bring the ports thereof into registering alinement with the intake and exhaust passages of the engine during each cycle of revolution of the cylinder and driven shaft; a further object being to provide an automatic clutch for placing the power shaft in operative engagement with the supplemental shaft through a planetary gear; a further object being to provide means for definitely stopping the cylinder heads after each travel of 180° in the rotating cylinder; and with these and other objects in view, the invention consists in an engine of the class and for the purpose specified, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 2 is a transverse section on the line 2—2 of Fig. 1.

Figure 1:
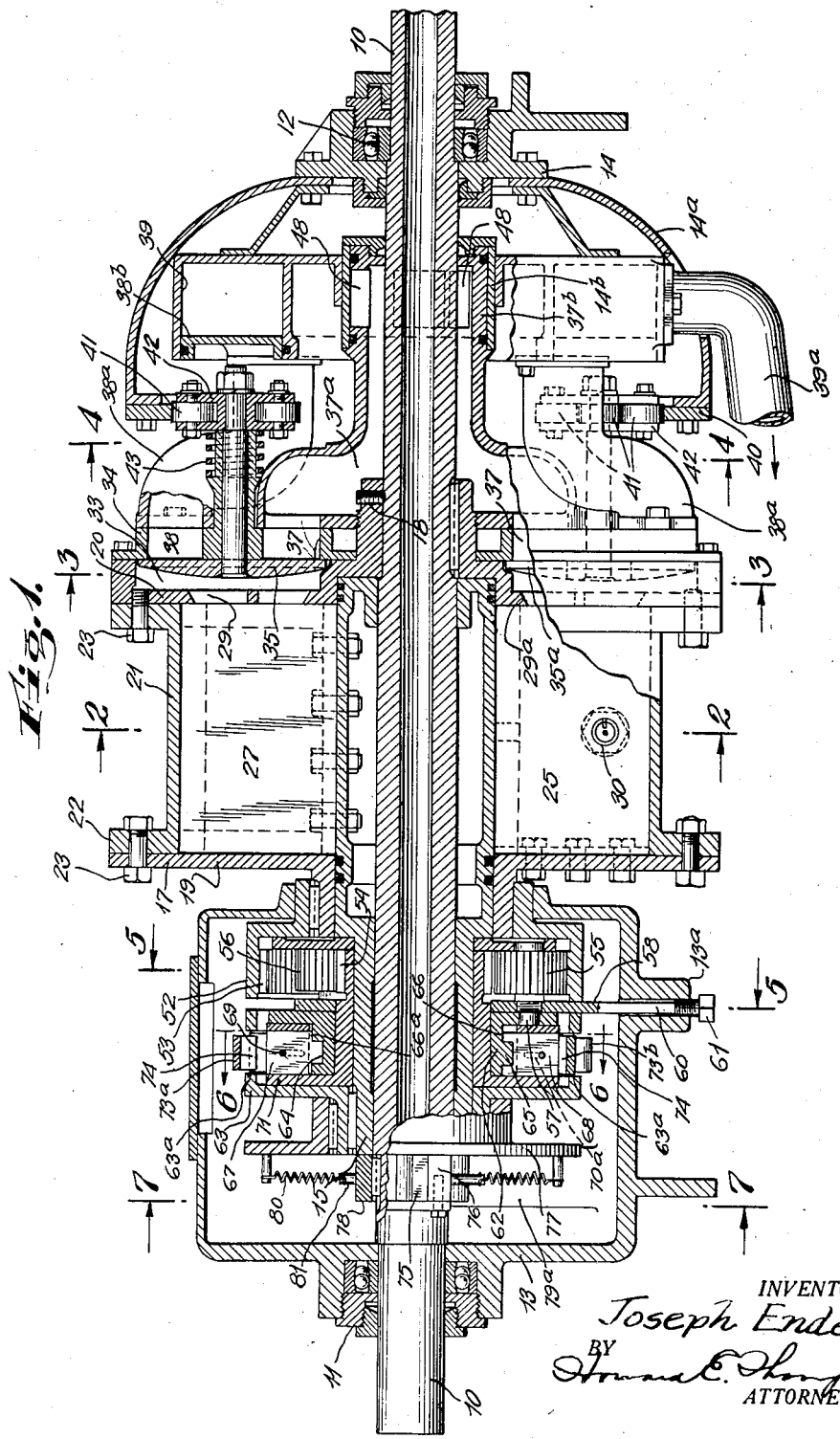
Fig. 1 is a longitudinal, sectional view through an engine made according to my invention and indicating parts of the construction in full lines.
Figure 3:
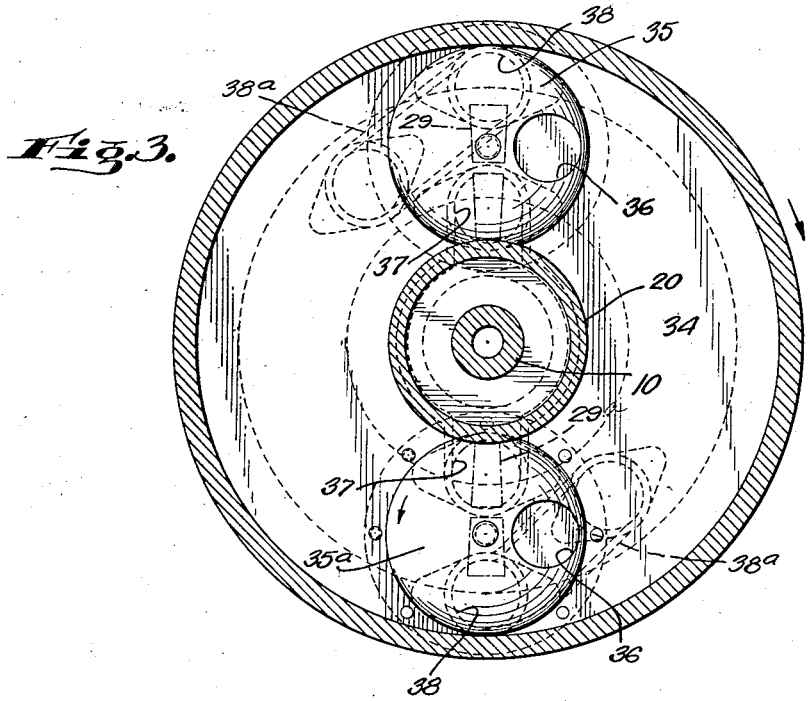
Figure 4:
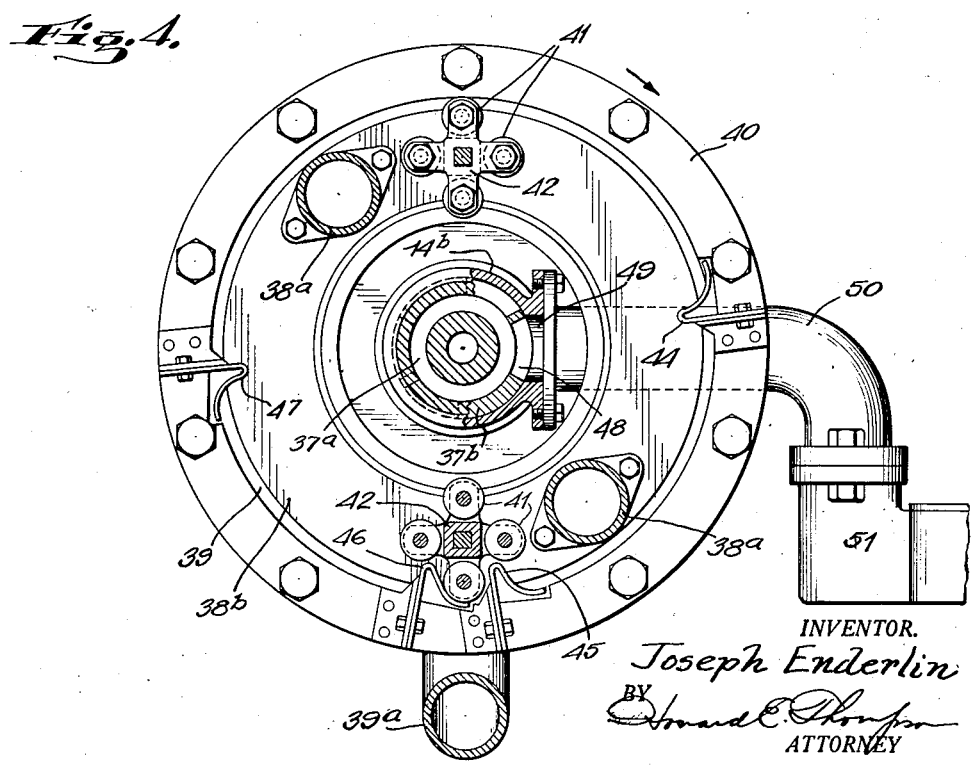

Fig. 3 is a section on the line 3—3 of Fig. 1.
Fig. 4 is a section on the line 4—4 of Fig. 1.
Fig. 5 is a section on the line 5—5 of Fig. 1.
Fig. 6 is a section on the line 6—6 of Fig. 1; and,
Fig. 7 is a section on the line 7—7 of Fig. 1.

For the purpose of illustrating one method of carrying my invention into effect, I have shown in the accompanying drawings, certain details of construction for operating the several mechanisms, and it will be understood, at this time, that the means shown is illustrative of one method only of performing the desired function.

In the drawings, 10 represents the driven shaft supported in suitable bearings 11 and 12 in the casing parts 13 and 14 respectively. Rotatably mounted on the shaft 10 is a supplemental shaft 15, upon which a cylinder structure 17 is rotatably mounted, the latter being secured to the shaft 10 as seen at 18. The cylinder structure 17 consists of two side plates or walls 19 and 20 coupled together by an annular wall 21 having flanged sides 22, by means of which the same is secured to the walls 19 and 20 by bolts or screws 23.

The side walls 19 and 20 and annular wall 21 form within the cylinder structure 17, an annular cylinder around the shaft 15, which is subdivided into two chambers 24 and 24a by pistons 25 secured to the walls 19 and 20, and transversely filling the space between said walls as well as the shaft 15 and the annular wall 21 of the cylinder. Suitable packing 26 is provided between the surfaces of the pistons and the shaft 15 to provide a seal between said parts in the operation of the engine. At 27, I have shown two cylinder heads secured to and movable with the shaft 15 and disposed within the chambers 24 and 24a and cooperating with the pistons 25, the heads 27 being arranged in opposed relation to each other or in other words at 180° to each other in the same manner as the arrangement of the pistons in the cylinders. Suitable packings 28 are provided around the heads 27 so as to seal said heads in their movement within the chambers 24—24a of the cylinder in the operation of the engine.

In the side wall 20 of the cylinder are arranged ports 29, 29a, which serve as intake and exhaust ports and are disposed adjacent each of the pistons 25, spark plugs 30 being mounted in the pistons 25 for igniting the gases in the operation of the engine, said plugs being accessible through openings 31 formed in the annular wall 21 of the cylinder. The openings 31 are controlled by closures 32.

The ports 29—29a open into an annular chamber 33 formed between the side wall 20 of the cylinder and a valve casing 34 in which is rotatably supported in opposed relation with respect to each other, disk valves 35, 35a, each valve having ports 36 adapted to register with intake ports 37 and exhaust ports 38, the intake and exhaust ports 37 and 38 being in the opposed relation indicated in Fig. 3 of the drawings. The ports 37 communicate with an intake manifold 37a, and the ports 38 communicate with exhaust pipes 38a employing a ring 38b rotatably mounted in an exhaust housing 39 constituting part of the casing 14 and having an exhaust pipe 39a, note Fig. 1 of the drawings.

The casing 14 includes a dome-shaped housing 14a enveloping the exhaust housing 39. At the free, inner end of the housing is secured a ring 40 upon the inner, circumferential edge of which is adapted to move the rollers 41 of valve operating members or quadrants 42 having four radially extending arms, each supporting one of the rollers 41. The members 42 are keyed and secured to the stems of the valves 35, 35a. Springs 43 are employed to hold the valves seated upon the casing 34.

Supported on the inner, circumferential faces of the ring 40 are trip devices 44, 45, 46 and 47 arranged at such spaced intervals circumferentially of the ring as to engage the rollers 41 of the members 42 to intermittently rotate the valves 35, 35a, one-quarter revolution in passing each of the trips 44, 45, 46 and 47 so as to move the ports 36 of the valves into position to register with the intake and exhaust ports during each cycle of operation of the engines as later described.

The intake manifold 37a has a tubular extension 37b rotatable in a suitable bearing 14b in the casing 14, and the extension 37b is provided with large circumferential openings 48 adapted to register with a port 49 formed in the bearing 14b, note Fig. 4 of the drawings, the apertured portion of the bearing being flanged to permit the attachment of an intake pipe 50 which leads to a carburetor or other source of fuel supply 51.

Arranged in the casing 13 is a clutch and planetary gearing structure, comprising a casing part 52 secured to the cylinder structure 17 and rotatable therewith. Said part has an internal gear 53, note Fig. 5 of the drawings. Rotatably mounted on the supplemental shaft 15 is a gear 54, between which and the internal gear 53 are three pairs of intermeshing pinions 55, 56, the pinions 55 meshing with the gear 53 and the pinions 56 meshing with the gear 54. The pinions include shafts or studs 57 secured to a bearing plate 58 which is supported in the casing 13 by a tongue 60 which projects into a recessed portion 13a formed in the casing and held therein by set screws 61. The tongue 60 permits adjustment of the gear chain to advance or retard the cylinder heads.

The bearing plate 58 holds the axis of the pinions against circumferential movement around the shaft 10, and the planetary gearing illustrated is for the purpose of intermittently rotating the shaft 15 at twice the speed of rotation of the shaft 10 and the cylinder structure 17, for the purposes later described.

The studs 57 of the pinions extend into a clutch cam 62 which is thus held stationary and against rotary movement with respect to the shafts 10 and 15. Secured to the shaft 15 is a clutch casing or drum 63 which encircles the cam 62, and by means of which the shaft 15 may be intermittently driven at twice the speed of the shaft 10 through the planetary gearing employed. The clutch cam 62 has a combination tongue and groove cam surface on the periphery of the sleeve portion thereof. The groove is indicated at 64 at the top of Fig. 1, and the tongue at 65 at the bottom of Fig. 1; whereas, in Fig. 6 of the drawings which constitutes a section on the line 6—6 of Fig. 1, looking to the left as indicated by the arrows, the groove 64 will appear in dotted lines and the bottom wall of this groove gradually increases in diameter from its lowest depth at 64a to its highest point at 64b, where it is flush with the outer surface of the sleeve portion of the cam; whereas, the tongue 65 continues in a true, concentric plane to the point 64a where it meets the beginning of the groove 64.

At each side of the tongue 65 are recesses 66 which being with their greatest depth at the point 64b and the shallowest point of which terminates at the point 64a or in line with the outer surface of the cam or the tongue 65 thereof, thus forming two camming surfaces 66a and at opposite sides of the tongue 65 which are equivalent to the camming surface formed by the groove 64. The purpose of this construction is to provide for the proper movement of the clutch dogs 67, 68, with the clutch drum 63 as will be apparent. The dog 67 is provided with an inwardly directed tongue which cooperates with the groove 64 and tongue 65 of the cam, whereas the dog 68 has a central recess which cooperates with the tongue 65, and the side walls of said dog cooperate with the camming surface 66a of the cam. Each dog 67 and 68 includes a pin 69, by means of which the dog is slidably mounted in suitable guide blocks 70 secured to radially extending members 71 constituting part of the gear 54 or in elongated apertures 70a formed in said blocks. Springs 72 are coupled with each end of the pin and to the extensions 71, note Fig. 6 of the drawings, to normally support the dogs 67 and 68 in engagement with the outer surface of the cam 62.

Supported in connection with the clutch drum 63 in opening 63a formed therein are spring brake and catch devices 73 having inwardly projecting lugs 74 at the ends thereof, in connection with which the dogs 67 and 68 are adapted to operate in the operation of rotating the clutch housing and the shaft 15 during 180° travel of the shaft 15 and the cylinder heads 27, at the end of which travel, the cam 62 will release the dogs 67 and 68 and permit them to be moved into inoperative position such as shown in Fig. 6 of the drawings. In this connection, it is to be understood that the gear 54 which is driven at twice the speed of the gear 52 will move the dogs 67 and 68 through 180° bringing them from the position shown in Fig. 6 into the locked position engaging the lugs 74 in the one-quarter revolution of the pistons 25 and cylinder structure 17, while the heads 27 and drum 63 remain idle. During the last quarter of the revolution of the pistons 25 from the dotted line position indicated in Fig. 2 to the full line position thereof, the dogs 67 and 68 will have traveled another 180° carrying the drum 63 therewith until said dogs and drum again assume the position shown in Fig. 6, in which position the dogs 67 and 68 are released. Supplemental spring arms 73a are employed for reinforcing the brake and catch devices 73, the arms 73a having hooked ends 73b which engage the members 73 adjacent the lugs 74 thereon. It will be understood that as the dogs 67 and 68 move relatively to the devices 73, the spring action of said devices will serve to brake the movement of said dogs prior to engaging the lugs 74.

I also employ means for intermittently stopping the rotation of the shaft 15 and the cylinder heads 27 carried thereby after each 180° rotary movement thereof, and to back up said heads against the explosive gases and to form a wall structure at one side of the ports, permitting the suction stroke of the pistons 25, as will be apparent. This result is accomplished by lock bolts 75 mounted in radial slideways or guides 76 on a disk 77 keyed or otherwise secured to the drum 63. The lock bolts 75 will move outwardly by a stop cam 78 secured to the shaft 10 so that the lock bolts may be moved into engagement with stop plates or blocks 79 constituting part of the casing 13 as clearly seen in Fig. 7 of the drawings. Springs 80 are employed for holding the lock bolts 75 in constant engagement with the cam 78. However, the bolts 75 are held in engagement with the stops 79 by the cam 78 in the one-quarter revolution of the shaft 10, during which the cylinder heads 27 remain idle.

It will also be noted that the surfaces 79a in the casing 13 serve to guide the bolts 75 into proper position on the plates or blocks 79 prior to being projected outwardly by the cams 78 as will be apparent. It will also be understood that the pins 81 to which the springs 80 are secured, are coupled with the bolts 75 and operate in suitable slots provided in the guideways 76 in the same manner as the movement of the pins 69 in the guide blocks 70.

The operation of my improved engine will be readily understood from the foregoing brief description of the several parts when taken in connection with the accompanying drawings and the following statement. Assuming that the position of the piston and cylinder head at the top of Fig. 2 is a starting position wherein the compressed gases between adjacent faces of said head 27 and piston 25 are just ignited by the spark plug 30 employed, the piston will be moved during the firing stroke into the position indicated in dotted lines in Fig. 2. The intake and exhaust port remain closed by reason of the fact that the valve 35 remains in the position shown in Fig. 3 of the drawings during this cycle of operation. Upon the continued movement of said piston, the head 27 will be released by the action of cam 78 and bolts 75 and the exhaust port 36 of the valve 35 opened by reason of the rotation of the member 42 by engagement with the trip 44 to bring the port 36 of the valve 35 into registering position with the exhaust port 38. As the head 27 travels at twice the speed of the piston 25, the same catches up with the piston 25 when the latter assumes the lower position of the piston 25 shown in Fig. 2, the head being actuated through the clutch and the gears 53—56 as heretofore stated, and the burnt gases are being exhausted through the ports 29—29a carried by the cylinder structure 17. Just prior to completing the 180° travel of the first named head, the valve 35 is again rotated by the engagement of the member 42 thereof with the trip 45, and the first named head 27 is again locked in position by the bolts 75. As the piston 25 continues to travel through another quarter revolution, the member 42 is again actuated by the trip 46 to again rotate the valve 35 to bring the port 36 thereof into registering aline-ment with the intake port 37 allowing the gaseous mixture to be sucked into the cylinder between said piston and head.

In reaching the dotted line position of the piston 25 indicated at the left of Fig. 2, the member 42 of the valve 35 is again rotated by the trip 47 to close the intake passage. At this time, the first named head 27 is again released by the action of the cam 78 and bolts 75 and travels at twice the speed of the first named piston 25, which is now traveling to its first position, during which operation, the gases are compressed between the head 27 and piston 25, and the engine is now ready for the next cycle of operation.

In the above stated operation, which is confined to one head and one piston, it will be understood that the lower head and piston shown in Fig. 2 of the drawings is about to perform its suction stroke while the upper head and piston performs the firing stroke. In like manner, the head 27 and piston 25 shown at the bottom of Fig. 2, perform the firing stroke, while the first named head and piston is performing the intake stroke. In other words, during each complete cycle of revolution of the shaft 10, there will be two firing strokes, two exhaust strokes, two intake strokes and two compression strokes being performed.

During the cycles of operation of the pistons above stated and the intermittent holding of the heads 27 stationary during a one-quarter revolution of the pistons, the clutch, functioning through the planetary gearing, is actuated in the manner specifically herein before described to move the dogs 67 and 68 outwardly to engage the clutch drum 63 to cause the same and the heads 27 and shaft 15 to be driven at twice the speed of the speed at which the pistons travel in driving the shaft 10.

At the same time, the lock bolts 75 are moved into engagement with the stops 79 to take up and resist the pressure against the stationary heads 27 during the firing strokes.

It will be understood that while I have shown certain details of construction for carrying my invention into effect and have illustrated a method of retaining the heads against movement and in providing the ratio of firing herein shown and described, that my invention is not limited in these respects, and various changes in the gearing and valve operation may be made to modify the ratio of firing of the cylinder and to control the intake and exhaust of the gases, and various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. An engine of the class described comprising a rotatable cylinder structure involving an annular cylinder, pistons coupled with the cylinder structure and transversing said annular cylinder to divide the same into independent cylinder chambers, means disposed in each of said chambers and transversing the same for forming cylinder heads, means intermediate the heads and pistons for introducing fuel into said chambers, the ignition of which will drive said pistons, and the burnt gases being exhausted by the movement of said heads toward said pistons, means for intermittently stopping and retaining said heads against movement during the firing and suction strokes of said pistons in their movement relatively to said heads, and an automatically actuated clutch comprising a clutch drum coupled with the cylinder heads and including spring catch devices spaced circumferentially thereon and a plurality of dogs in operative engagement with the pistons and movable radially for engagement with said devices to drive said heads through said rotatable cylinder structure.

2. An engine of the class described comprising a rotatable cylinder structure involving an annular cylinder, pistons coupled with the cylinder structure and transversing said annular cylinder to divide the same into independent cylinder chambers, means disposed in each of said chambers and transversing the same for forming cylinder heads, means intermediate the heads and pistons for introducing fuel into said chambers, the ignition of which will drive said pistons, and the burnt gases being exhausted by the movement of said heads toward said pistons, means for intermittently stopping and retaining said heads against movement during the firing and suction strokes of said pistons in their movement relatively to said heads, an automatically actuated clutch comprising a clutch drum coupled with the cylinder heads and including spring catch devices spaced circumferentially thereon and a plurality of dogs in operative engagement with the pistons and movable radially for engagement with said devices to drive said heads through said rotatable cylinder structure, and said dogs being placed in operative engagement with the pistons through a gear chain adapted to actuate said dogs, clutch drum and cylinder heads at a speed twice that of the speed of rotation of said pistons.

3. An engine of the class described comprising a rotatable cylinder structure involving an annular cylinder, pistons coupled with the cylinder structure and transversing said annular cylinder to divide the same into independent cylinder chambers, means disposed in each of said chambers and transversing the same for forming cylinder heads, means intermediate the heads and pistons for introducing fuel into said chambers, the ignition of which will drive said pistons, and the burnt gases being exhausted by the movement of said heads toward said pistons, means for intermittently stopping and retaining said heads against movement during the firing and suction strokes of said pistons in their movement relatively to said heads, an automatically actuated clutch comprising a clutch drum coupled with the cylinder heads and including spring catch devices spaced circumferentially thereon and a plurality of dogs in operative engagement with the pistons and movable radially for engagement with said devices to drive said heads through said rotatable cylinder structure, said dogs being placed in operative engagement with the pistons through a gear chain adapted to actuate said dogs, clutch drum and cylinder heads at a speed twice that of the speed of rotation of said pistons, and a cam controlling the radial movement of said dogs.

4. An engine of the class described comprising a rotatable cylinder structure involving an annular cylinder, pistons coupled with the cylinder structure and transversing said annular cylinder to divide the same into independent cylinder chambers, means disposed in each of said chambers and transversing the same for forming cylinder heads, means for intermittently stopping and retaining said heads against movement during the firing and suction strokes of said pistons in their movement relatively to said heads, the pistons being driven by the explosive charge, means for moving the heads at twice the speed of said pistons during the exhaust and compression strokes, means including valves disposed adjacent the pistons of the cylinder structure and rotated therewith for controlling the introduction of gases between the pistons and cylinder heads and the exhaust of gases therefrom, said means including a quadrant carried by each of said valves and an annular fixed ring having circumferentially spaced trip elements engaging said quadrant to intermittently rotate said valves to open and close the intake and exhaust communications with the cylinder structure during each cycle of revolution of the pistons and heads.

5. An engine of the class described comprising a driven shaft, a cylinder structure coupled with said shaft and by means of which the same is driven, the cylinder structure including a piston transversing the cylinder thereof and coupled therewith, a head intermittently held against movement with respect to the cylinder structure and piston during the firing and suction strokes of the piston, sparking means mounted in the piston and exposed to the chamber between the piston and head to ignite the compressed gases, and means including the cylinder structure for actuating said head at a speed greater than the speed of travel of said piston during the exhaust and compression strokes of the engine.

6. An engine of the class described comprising a driven shaft, a cylinder structure coupled with said shaft and by means of which the same is driven, the cylinder structure including a piston transversing the cylinder thereof and coupled therewith, a head intermittently held against movement with respect to the cylinder structure and piston during the firing and suction strokes of the piston, sparking means mounted in the piston and exposed to the chamber between the piston and head to ignite the compressed gases, means including the cylinder structure for actuating said head at a speed greater than the speed of travel of said piston during the exhaust and compression strokes of the engine, and said last named means comprising an automatically actuated clutch involving opposed radially movable dogs and a cam controlling the actuation of said dogs.

7. An engine of the class described comprising a driven shaft, a cylinder structure coupled with said shaft and by means of which the same is driven, the cylinder structure including a piston transversing the cylinder thereof and coupled therewith, a head intermittently held against movement with respect to the cylinder structure and piston during the firing and suction strokes of the piston, sparking means mounted in the piston and exposed to the chamber between the piston and head to ignite the compressed gases, means including the cylinder structure for actuating said head at a speed greater than the speed of travel of said piston during the exhaust and compression strokes of the engine, said last named means comprising an automatically actuated clutch involving opposed radially movable dogs and a cam controlling the actuation of said dogs, and a gear train placing the cylinder structure and piston in operative engagement with the cylinder head for actuating the same at a predetermined increased speed.

8. An engine of the class described comprising a driven shaft, a cylinder structure coupled with said shaft and by means of which the same is driven, the cylinder structure including a piston transversing the cylinder thereof and coupled therewith, a head intermittently held against movement with respect to the cylinder structure and piston during the firing and suction strokes of the piston, sparking means mounted in the piston and exposed to the chamber between the piston and head to ignite the compressed gases, means including the cylinder structure for actuating said head at a speed greater than the speed of travel of said piston during the exhaust and compression strokes of the engine, the cylinder structure having a combined intake and exhaust passage adjacent one side of said piston, and an independently rotatable valve mounted in and movable with the cylinder structure and disposed adjacent said passage to control the intake and exhaust of the engine.

9. An engine of the class described comprising a driven shaft, a cylinder structure coupled with said shaft and by means of which the same is driven, the cylinder structure including a piston transversing the cylinder thereof and coupled therewith, a head intermittently held against movement with respect to the cylinder structure and piston during the firing and suction strokes of the piston, sparking means mounted in the piston and exposed to the chamber between the piston and head to ignite the compressed gases, means including the cylinder structure for actuating said head at a speed greater than the speed of travel of said piston during the exhaust and compression strokes of the engine, the cylinder structure having a combined intake and exhaust passage adjacent one side of said piston, an independently rotatable valve mounted in and movable with the cylinder structure and disposed adjacent said passage to control the intake and exhaust of the engine, and means carried by said valve cooperating with circumferentially spaced stationary trips for automatically actuating the valve to control the opening and closing of the intakes and exhaust passages during each cycle of operation of the engine.

10. In a rotary engine of the class described, a driven shaft, a cylinder structure coupled with said shaft and by means of which the same is driven, the cylinder structure including a piston transversing said cylinder and coupled therewith and a head intermittently held open against movement with respect to the cylinder structure and piston during the firing and suction strokes of the piston, a combined intake and exhaust passage on the cylinder structure adjacent the piston and disposed between the piston and head at the beginning of the firing and suction strokes, a rotary valve mounted in and movable with the cylinder structure adjacent said passage and controlling the communication of independent intake and exhaust ports with said passage, and means involving an annular stationary member having circumferentially spaced trips cooperating with said valve to rotate the same to open and close said intake and exhaust ports during each cycle of revolution of the engine.

11. In a rotary engine of the class described, a driven shaft, a cylinder structure coupled with said shaft and by means of which the same is driven, the cylinder structure including a piston transversing said cylinder and coupled therewith and a head intermittently held open against movement with respect to the cylinder structure and piston during the firing and suction strokes of the piston, a combined intake and exhaust passage on the cylinder structure adjacent the piston and disposed between the piston and head at the beginning of the firing and suction strokes, a rotary valve mounted in and movable with the cylinder structure adjacent said passage and controlling the communication of independent intake and exhaust ports with said passage, means involving an annular stationary member having circumferentially spaced trips cooperating with said valve to rotate the same to open and close said intake and exhaust ports during each cycle of revolution of the engine, and means involving a clutch having cam actuated dogs for intermittently actuating the cylinder head at twice the speed of said piston during the exhaust and compression strokes of the engine.

12. In a rotary engine of the class described, a driven shaft, a cylinder structure coupled with said shaft and by means of which the same is driven, the cylinder structure including a piston transversing said cylinder and coupled therewith and a head intermittently held open against movement with respect to the cylinder structure and piston during the firing and suction strokes of the piston, a combined intake and exhaust passage on the cylinder structure adjacent the piston and disposed between the piston and head at the beginning of the firing and suction strokes, a rotary valve mounted in and movable with the cylinder structure adjacent said passage and controlling the communication of independent intake and exhaust ports with said passage, means involving an annular stationary member having circumferentially spaced trips cooperating with said valve to rotate the same to open and close said intake and exhaust ports during each cycle of revolution of the engine, means involving a clutch having cam actuated dogs for intermittently actuating the cylinder head at twice the speed of said piston during the exhaust and compression strokes of the engine, and automatically actuated means for retaining the cylinder head against movement during the firing and suction strokes.

13. An engine of the class described comprising a driven cylinder structure including an annular cylinder, a pair of oppositely disposed pistons forming part of the cylinder structure and transversing said annular cylinder, a driven shaft in operative engagement with the cylinder structure, two oppositely disposed cylinder heads arranged in and transversing said annular cylinder, means for intermittently retaining the cylinder heads against movement during a 90° travel of said pistons with the cylinder structure during the firing and suction strokes of said pistons, said heads being released at the end of said 90° travel, and means involving a cam rotated at twice the speed of the rotation of said cylinder structure for clutch engaging said heads to move the same through an arc of substantially 180° in the continued movement of the pistons through another 90° of travel during the exhaust and compression strokes of the engine.

14. An engine of the class described comprising a driven cylinder structure including an annular cylinder, a pair of oppositely disposed pistons forming part of the cylinder structure and transversing said annular cylinder, a driven shaft in operative engagement with the cylinder structure, two oppositely disposed cylinder heads arranged in and transversing said annular cylinder, means for intermittently retaining the cylinder heads against movement during a 90° travel of said pistons with the cylinder structure during the firing and suction strokes of said pistons, said heads being released at the end of said 90° travel, and means involving a cam rotated at twice the speed of the rotation of said cylinder structure for clutch engaging said heads to move the same through an arc of substantially 180° in the continued movement of the pistons through another 90° of travel during the exhaust and compression strokes of the engine, said last named means involving clutch dogs actuated by said cam.

15. An engine of the class described comprising a driven cylinder structure including an annular cylinder, a pair of oppositely disposed pistons forming part of the cylinder structure and transversing said annular cylinder, a driven shaft in operative engagement with the cylinder structure, two oppositely disposed cylinder heads arranged in and transversing said annular cylinder, means for intermittently retaining the cylinder heads against movement during a 90° travel of said pistons with the cylinder structure during the firing and suction strokes of said pistons, said heads being released at the end of said 90° travel, means involving a cam rotated at twice the speed of the rotation of said cylinder structure for clutch engaging said heads to move the same through an arc of substantially 180° in the continued movement of the pistons through another 90° of travel during the exhaust and compression strokes of the engine, said last named means involving clutch dogs actuated by said cams, and a gear chain coupling the cylinder structure with the cam in a two to one ratio.

16. An engine of the class described comprising a driven cylinder structure including an annular cylinder, a pair of oppositely disposed pistons forming part of the cylinder structure and transversing said annular cylinder, a driven shaft in operative engagement with the cylinder structure, two oppositely disposed cylinder heads arranged in and transversing said annular cylinder, means for intermittently retaining the cylinder heads against movement during a 90° travel of said pistons with the cylinder structure during the firing and suction strokes of said pistons, said heads being released at the end of said 90° travel, means involving a cam rotated at twice the speed of the rotation of said cylinder structure for clutch engaging said heads to move the same through an arc of substantially 180° in the continued movement of the pistons through another 90° of travel during the exhaust and compression strokes of the engine, said last named means involving clutch dogs actuated by said cams, a gear chain coupling the cylinder structure with the cam in a two to one ratio, the cylinder structure having combined intake and exhaust passages adjacent said pistons and disposed between the pistons and heads when in juxtaposition, and rotatable valves arranged adjacent said passages and movable with the cylinder structure controlling the communication between intake and exhaust ports and said passages.

17. An engine of the class described comprising a driven cylinder structure including an annular cylinder, a pair of oppositely disposed pistons forming part of the cylinder structure and transversing said annular cylinder, a driven shaft in operative engagement with the cylinder structure, two oppositely disposed cylinder heads arranged in and transversing said annular cylinder, means for intermittently retaining the cylinder heads against movement during a 90° travel of said pistons with the cylinder structure during the firing and suction strokes of said pistons, said heads being released at the end of said 90° travel, means involving a cam rotated at twice the speed of the rotation of said cylinder structure for clutch engaging said heads to move the same through an arc of substantially 180° in the continued movement of the pistons through another 90° of travel during the exhaust and compression strokes of the engine, said last named means involving clutch dogs actuated by said cams, a gear chain coupling the cylinder structure with the cam in a two to one ratio, the cylinder structure having combined intake and exhaust passages adjacent said pistons and disposed between the pistons and head when in juxtaposition, rotatable valves arranged adjacent said passages and movable with the cylinder structure controlling the communication between intake and exhaust ports and said passages, and means involving a stationary ring for intermittently rotating said valves to open and close the exhaust ports during the cycles of revolution of the engine.

JOSEPH ENDERLIN.